United States Patent [19]

Hubbard

[11] Patent Number: 4,726,902
[45] Date of Patent: Feb. 23, 1988

[54] CYCLONE DEGRITTER FOR SOLIDS LIQUIDS SEPARATION

[75] Inventor: Peter J. Hubbard, Norwalk, Conn.

[73] Assignee: Dorr-Oliver Incorporated, Stamford, Conn.

[21] Appl. No.: 45,107

[22] Filed: May 1, 1987

[51] Int. Cl.$^4$ .............................................. B01D 17/038
[52] U.S. Cl. ............................... 210/512.2; 209/144; 209/211
[58] Field of Search ............................ 210/788, 512.2; 209/144, 211; 55/401, 447–450, 452, 459 R

[56] References Cited

U.S. PATENT DOCUMENTS

| | | | |
|---|---|---|---|
| 4,148,723 | 4/1979 | Mozley | 210/512.2 |
| 4,168,231 | 9/1979 | Allen et al. | 210/788 |
| 4,208,270 | 6/1980 | Grieve et al. | 210/512.2 |
| 4,501,664 | 2/1985 | Heil et al. | 210/788 |

Primary Examiner—Frank Sever
Attorney, Agent, or Firm—H. M. Snyder

[57] ABSTRACT

The cyclone degritter particularly suited for household use for receiving, degritting and discharging a water feed flow. The cyclone degritter comprises a pressurized housing containing a cyclonic degritter cartridge with a plurality of small hydro-cyclones arranged within a shell for collecting grit and an overflow vessel for directing clarified liquid to the housing overflow connection. In one form there is a bleed line from the top region of the shell or grit pot to the overflow for providing substantially improved recovery efficiency. In another form the cyclone degritter is provided with primary and secondary cyclone degritters with the primary set being used under conditions of low water flow while both primary and secondary sets are used for increased water flow.

11 Claims, 8 Drawing Figures

FIG. 1
FIG. 8
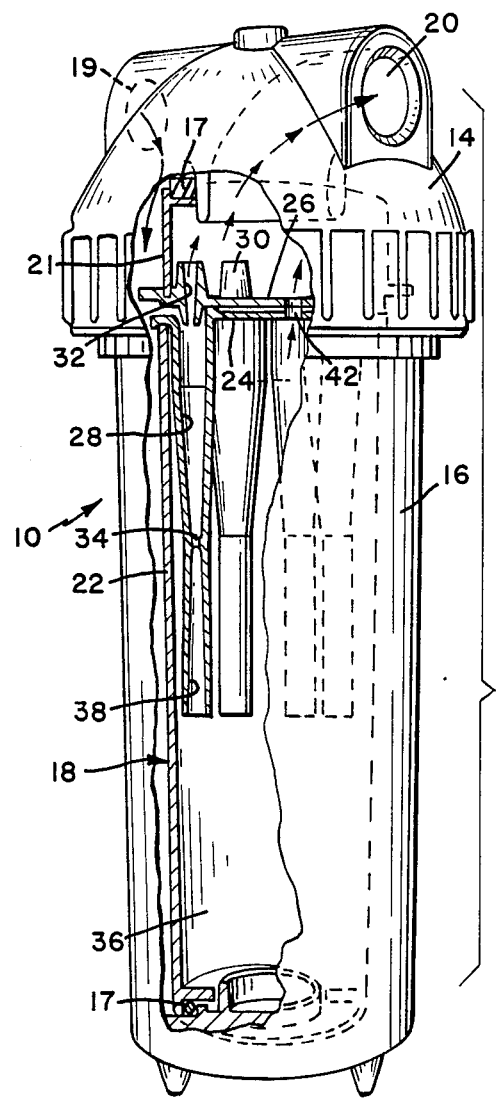
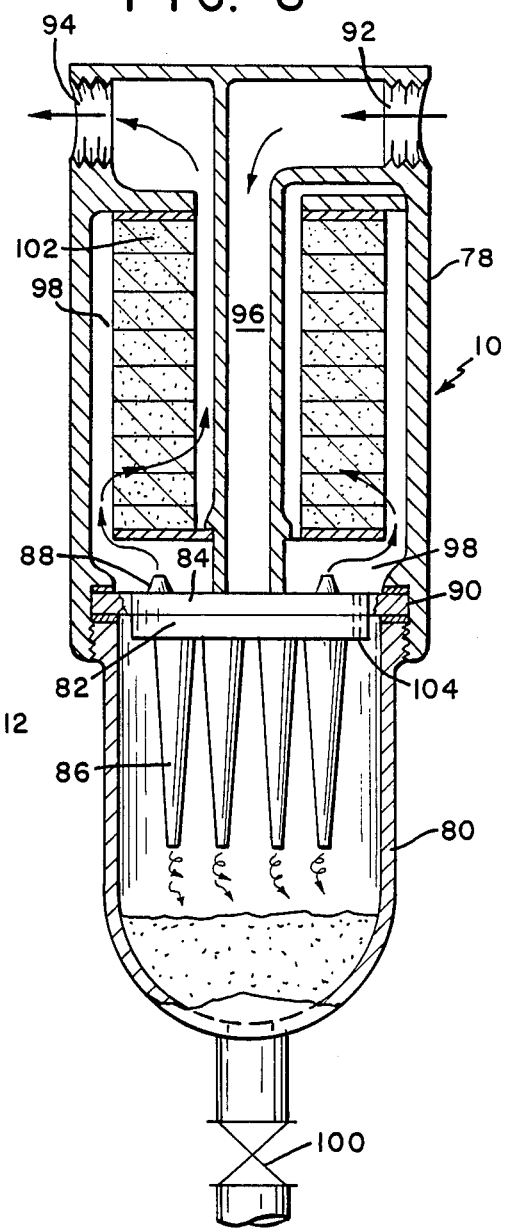

CYCLONE DEGRITTER FOR SOLIDS LIQUIDS SEPARATION

BACKGROUND OF THE INVENTION

The present invention relates to hydrocyclones for separating solid from liquids and particularly to cyclones for degritting water used in applications such as laboratories, air conditioning systems, household use and the like.

Cyclones are widely used for separating solids from liquids. A cyclone separator comprises a generally cylindrical/conical shell having a tangentially positioned inlet for fluid infeed and outlets for underflow and overflow. In the cyclone the fluid stream is forced to spiral inward and upwardly through a centrally located overflow outlet in the form of a purified liquid stream. The grit or heavy particles carried by the liquid are flung outward against the wall of the cone by reason of the vortex action and centrifugal force. The solids exit the cyclone through the apex of the cone as underflow. Ordinarily, a small perentage of the grit remains in the liquid spiraling inward and is carried with the overflow.

Underflow solids collectors called grit pots are used in applications where the feed solid fraction expected to be classified to the underflow is relatively small and the continuous loss of liquid to the underflow is undesirable. Once the solid concentration in the grit pot reaches a level at which the overflow quality of the cyclone can be affected, the pot is purged.

It is known that grit pots change the separation performance of cyclone separators due to the dilutriating effect on the enclosed underflow. That is, liquid which would normally discharge through the apex of the cyclone is reversed so that the liquid entering the overflow contains an increased grit content.

The performance of cyclones depends on a number of variables including cyclone diameter, liquid feed inlet diameter, vortex finder diameter, the pressure differential between inflow and overflow liquid streams, as well as characteristics of the liquid and particles to be separated. Generally speaking, small diameter cyclone separators require pressure drops between feed inlet and overflow of 20 psig or greater for their effectiveness. Hydrocyclones presently in use are not fully adequate in performance especially where low pressure small diameter cyclones are used in household applications for degritting water for household use including drinking water and for household applicances such as washing machines and so forth.

The present invention is directed to a cyclone separator for removal of grit from household water supply utilizing small diameter cyclones operating at low pressure differentials as between feed inlet and overflow. The invention also provides for improved separation performance of hydrocyclones fitted with grit pots.

SUMMARY OF THE INVENTION

The present invention is directed to a cyclone device for cleansing and particularly for degritting household water. In particular, the invention is directed to cyclonic devices effective to operate at low pressure differentials and at high performance levels in degritting household water.

In one form of the invention, a cyclone degritter receives water inflow, directs the inflowing water through a plurality of cyclone units with an underflow directed to a grit pot and an overflow of substantially purified water. In this form of the invention there is provided a bleed flow out of the grit pot into the overflow in order to improve cyclone performance by minimizing recycling of the underflow back into the body of the cyclone. Typically, the magnitude of the bleed flow from the grit pot to the overflow is small on the order of 2% to 8% of feed flow. Accordingly, a grit pot functions as a settling chamber so that the bleed flows leaves the grit pot at the top into the overflow with as little grit as possible. According to the invention, the provision of the small percentage bleed flow improves the collection efficiency to 86% from 76%. In effect, by arranging a small percentage of bleed flow the result is a cyclone separator with grit pot operating at maximum efficiency without reducing the volume of overflow cleansed by the cyclone separator.

According to the invention, the settling efficiency in the grit pot can be improved by the addition of baffles around the cyclone or by the addition of a lamella thickening chamber below the underflow discharge.

In ordinary household water conditions it is to be expected that the volume and pressure of flow of household water varies over a wide range so that it is desirable to select the number of cyclones according to conditions of water flow expressed in volume and pressure. Therefore, in another form of the invention there is provided sequential cyclone use in which there are provided primary and secondary cyclone flow chambers. If the feed flow pressure is at or below a predetermined level then a set of primary cyclones are provided which operate efficiently providing grit separation on the order of magnitude envisioned by this invention. Should the feed flow pressure be above the predetermined level then the cyclone of the present invention brings into play a set of secondary cyclones to provide degritting of the full feed flow into the cyclone. In this form of the invention the internal chambers providing feed flow to the cyclone degritter are provided with a valve member which is pressure actuated between predetermined feed flow levels. The first level would be at a low feed flow in which case the valve is closed directing feed flow to a primary set of cyclones which provide suitable degritting. If the feed flow level exceeds the predetermined level then the valve opens admitting feed flow to both primary and secondary cyclones which provide suitable degritting for the greater feed flow. Both the primary and secondary cyclones in this form of the invention emit grit to a common grit pot such that it is necessary to provide the secondary cyclones at their apexes with valves to prevent feed short-circuiting through the secondary cyclones when the control valve directs feed to the primary cyclone set only. When the control valve directs feed to the secondary cyclone set, then the apex valves open to provide degritting in the usual manner.

The principle of the present invention of providing for primary and secondary cyclones can be extended to multiple steps providing a third, fourth or $n^{th}$ increase in capacity while maintaining the optimum pressure differential for cyclone separation.

In accordance with the present invention, there is a substantial increase to approximately 86% from 76% removal of grit from feed flow where there is utilization of a grit pot with bleed feed from pot to overflow of between 2% to 8% of the feed flow and preferably between 2% and 4%.

The principles of the present invention may also be used for industrial applications for cyclone separators utilizing separate bleed line between the grit pot and the overflow line from the cyclone separator.

Cyclone separtors according to the invention may be provided in cartridge form in which a top closure forms a permanent part of a solids/liquids separation system for receiving feed flow and directing overflow from the separator, and a disposable cartridge embodying the cyclone unit and grit pot are disposable units. In another form utilizing a plurality of cyclone sets, the disposable unit is the grit pot itself. These cartridge-type units are especially suited for household use.

OBJECTS OF THE INVENTION

It is an object of the invention to provide a cyclone degritter for effectively degritting water at the variable feed flow conditions encountered in household use.

Another object is to provide a cyclone degritter with primary and secondary cyclone sets or additional sets in which the primary set provides degritting at a low flow rate and secondary or additional sets at progressively higher flow rates.

Another object of the invention is to provide improved separation performance for cyclone degritters utilizing a grit pot for collecting separated grit.

A further object of the invention is to provide a small volume bleed flow from a settled point in a grit pot into the over flow in order to improve separation performance of cyclone separators using grit pots.

Other and further objects of the invention will become apparent to those skilled in the art upon an understanding of the following detailed description or upon employment of the invention in practice.

DESCRIPTION OF THE DRAWINGS

Preferred embodiments of the invention have been chosen for purposes of illustrating its principles in which:

FIG. 1 is a perspective view partly broken away showing a preferred embodiment of cyclonic separator for degritting water in accordance with the present invention.

FIG. 8 is a section view in side elevation of a modified embodiment of the invention.

Figure 2:
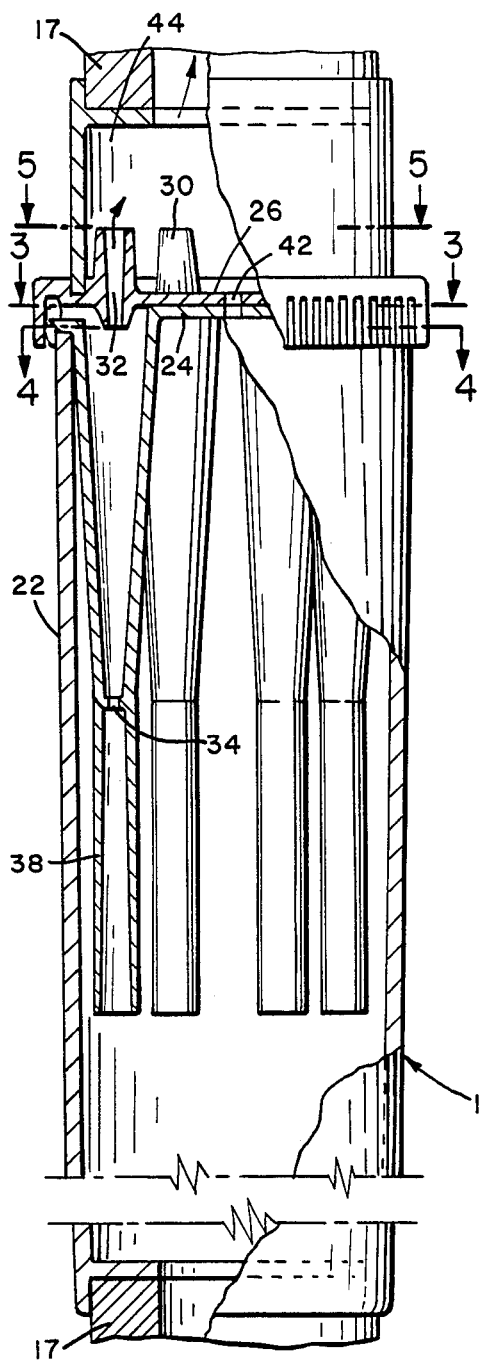
FIG. 2 is a side elevation thereof partly in section for illustrating the interior arrangement of separators according to the invention.
Figure 3:
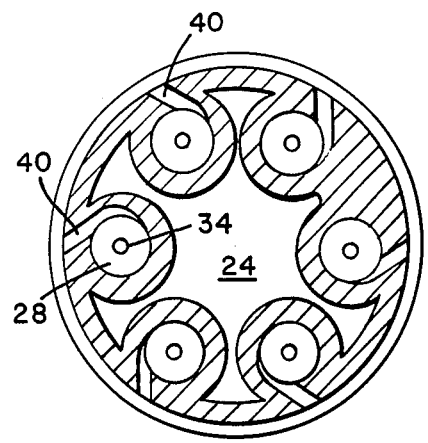
FIG. 3 is a plan view in section taken along line 3—3 of FIG. 2.
Figure 4:
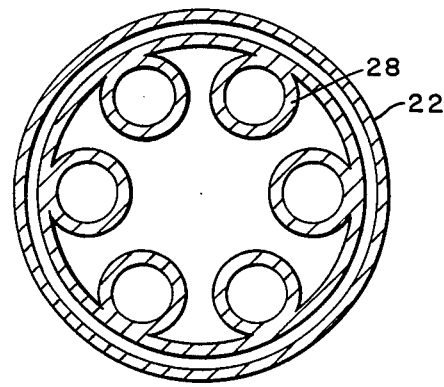
FIG. 4 is a plan view in section taken along line 4—4 of FIG. 2.
Figure 5:
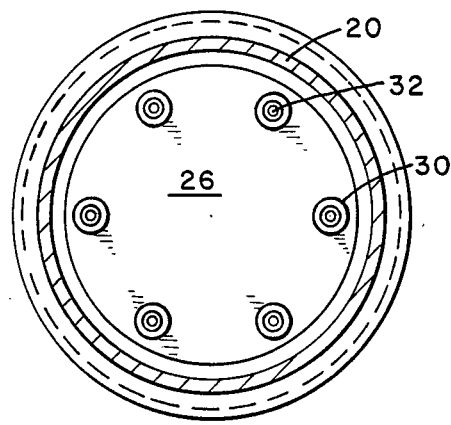
FIG. 5 is a plan view in section taken along line 5—5 of FIG. 2.

Referring now to the drawing, particularly FIGS. 1-5, a preferred embodiment of the cyclonic degritter assembly 10 according to the present invention includes a housing 12 having upper 14 and lower 16 housing members for encasing the cyclonic cartridge unit 18 and being particularly suited to household installation. The cyclonic degritter cartridge 18 is sealed within housing 12 with bottom and top gaskets 17. Feed inlet 19 and overflow outlet 20 openings are provided in upper housing member 14. The cyclone degritter cartridge within the housing includes a top closure 21, shell 22, together with a cyclone plate 24 interfacing and lying beneath a vortex finder plate 26. All parts of the cartridge 18 are assembled and held together mechanically or by adhesive. A plurality of conical cyclones 28, of suitable number of handle feed flow volume, depend from the cyclone plate into the interior of the shell defining the primary cyclones for removing grit from household water. The vortex finder plate is provided with a complementary number of vortex finders 30 aligned axially with each cyclone and defining upwardly open ducts 32 for carrying overflow from the cyclone to the clean water outlet. The cyclones include an open apex 34 for allowing grit separated from the water flow to be deposited in the bottom of the shell or grit pot 36 through downwardly extending tubes or baffles 38. These tubes direct separated solids toward the bottom of the grit pot reducing the opportunity of upward flow through the cyclone.

In operation water infeed is directed to the tangential inlets 40 at the upper end of each cyclone at sufficient pressure and velocity so that the water flows in a vortex in the cyclone with the grit being removed by centrifugal force and the cleansed overflow issuing through the vortex finders and out of the cyclone degritter for household use. The descending grit forms part of the underflow which is deposited in the lower region of the grit pot.

It is well known that cyclones operating with a grit pot suffer a loss of collection efficiency due to recycling of the underflow back into the body of the cyclone. According to the present invention, there is provided a bleed flow from the settled portion of the grit pot into the overflow. In one form of the invention, a bleed hole 42 is formed in the cyclone and vortex finder plates to provide for the bleed flow. The bleed hole is dimensioned to accommodate a very small bleed flow on the order of 2% to 8% of feed flow in the preferred embodiment. Preferably, the bleed flow is in the range of between 2% and 4% of feed flow. By this arrangement the grit pot is designed to function as a settling chamber so that the bleed flow exits the grit pot through the top, i.e., cyclone and vortex finder plates directly into overflow chamber 44 with as little solids as possible. Test results have determined that this very small settled bleed flow improves collection efficiency to 86% from 76% when a grit pot is used. The result accomplished by having this very small bleed flow is substantially the same as the operating efficiency of a cyclone degritter without a grit pot and also without a reduction of overflow occurring when grit pots are not used.

The settling efficiency of the cyclone degritter may be improved by the addition of cylindrical baffles around the cyclones as shown in the embodiment of FIG. 1 or by the addition of a lamella thickening chamber underneath the underflow discharge.

Figure 6:
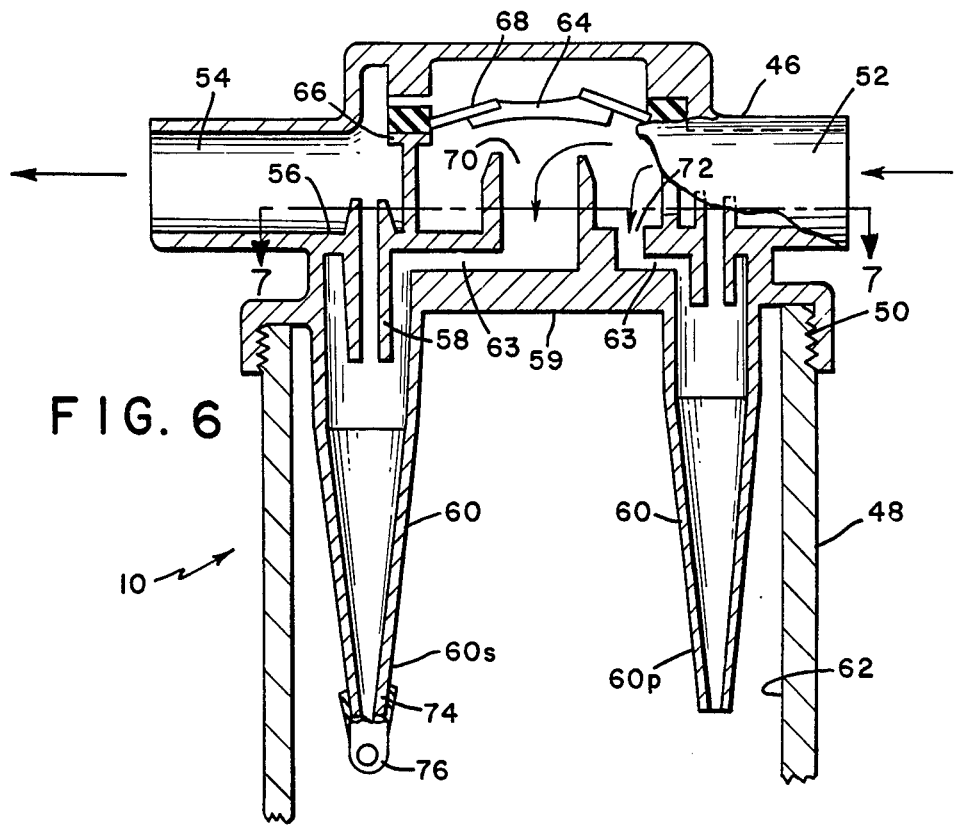
FIG. 6 is a section view in side elevation of a modified form of the present invention.
Figure 7:
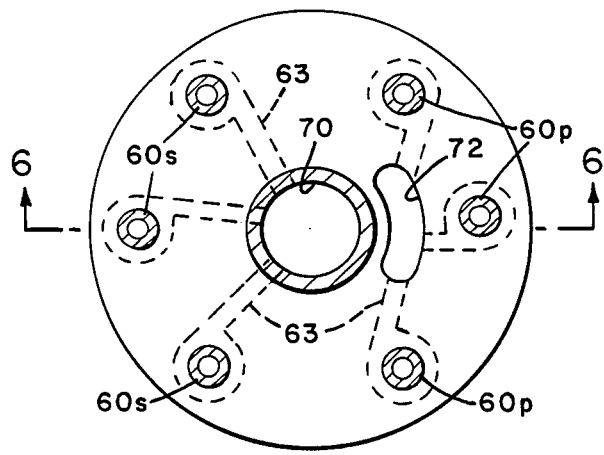
FIG. 7 is a section view taken along line 7—7 of FIG. 6.

In household use water flow conditions are variable including volume and pressure. It may become necessary to vary the number of cyclones being used as a function of particular flow conditions. To meet this necessity a modification of the invention is shown in FIGS. 6 and 7. Here the cyclone degritting cartridge 10 includes a top closure 46 and a shell 48 fitted together by a suitable threaded connection 50. The top closure includes inlet 52 and outlet 54 ports, a vortex finder plate 56 fitted with a plurality preferably six vortex finders 58 and a cyclone plate 59 fitted with a complementary number of cyclones 60 depending therefrom into the shell member 62 which defines the grit pot. Each cyclone has a tangential inlet 63.

The cyclones are grouped into primary 60p and secondary 60s cyclone sets with a pressure actuated seal 64 separating inflow from the primary and secondary cyclone members. The seal is fitted to the top closure between flanges 66 and includes a snap spring 68 in the top surface of the seal for snapping the seal in a downward position normally to seal a port of entry 70 into the set of secondary cyclones 60s. The seal itself is of suitable metallic and elastomeric material. With this arrangement the cyclone degrits water under both low and high pressure conditions. If a low flow condition is encountered, the seal cuts off entry of water to the secondary cyclones and degritting is performed by the primary cyclones with feed water directed to a primary entry port 72 to the cyclones 60p. If there is a rise in water flow then the snap spring is forced up and water flows to both primary and secondary cyclones for degritting.

The apexes 74 of the secondary cyclones are fitted with check valves 76 which prevent underflow short-circuit through the secondary cyclones into the overflow. The check valves open when the secondary cyclones receive water feed. To improve efficiency it is also desirable to provide a bleed hole for bleeding a small amount, say 2% to 8% of the feed flow, from the underflow into the overflow.

FIG. 7 illustrates the water distribution to both the primary and secondary cyclones, in this embodiment of the invention. Water feed enters the primary cyclones 60p through separate port of entry 72 up stream of the seal member which normally seals the port of entry 70 to the secondary cyclones 60s.

The preferred bleed hole described above is an internal port connecting the grit pot to the cleansed overflow. In some applications, particularly large industrial applications, the bleed line may connect from the upper portion of the grit pot externally directly to the overflow. For such applications the bleed volume should be the same per order as described above.

A further modification of the invention is shown in FIG. 8 in which the cyclonic degritter cartridge 10 includes a top closure 78 and shell 80 fitted together in a suitable manner. The cyclone plate 82 and the vortex finder plate 84 include a plurality of cyclones 86 and vortex finders 88. The plates themselves may be of integral construction received and sealed at the joint 90 of top closure and shell. The top closure has feed inlet 92 and overflow 94 ports and interior chambers 96, 98 for receiving and directing feed to the cyclones, and for receiving and directing the overflow from the cyclone. Heavy grit is deposited in the bottom of shell 80 which may be evacuated through a discharge valve 100. The overflow chamber 98 is provided with a cylindrical filter 102 for removing fine dirt from the overflow. A bleed duct 104 is provided for bleeding approximately 0.03 times the feed flow into the cyclone.

The embodiment of FIG. 1-5 of the invention is particularly suited as for use within cartridge housings which utilize replaceable cartridge filters. The cyclone degritter unit 18 replaces cartridge filters and can be periodically purged of grit and reused thereby providing a greater service life than conventional cartridge filters.

We claim:

1. A cyclone degritter for household use comprising a housing having upper and lower members, the upper housing member having means for receiving and directing feed flow of household water through the cyclone and for receiving and discharging degritted feed flow a top closure and a shell removably located within the housing defining a cyclonic degritting unit for receiving and degritting the feed flow, the top closure having water inlet and outlet openings and a receiving chamber for discharging degritted water through the outlet, the cyclonic unit further having a vortex finder plate with a plurality of vortex finders located thereon and a cyclone plate with a complementary plurality of downwardly depending cyclone members axially aligned with the vortex finders means for directing water into each cyclone tangentially thereof to generate vortex flow of water within the cyclone for the purpose of degritting the water and issuing overflow through the vortex finder into the receiving chamber of the top closure and issuing underflow grit into the shell serving as a grit pot and means for increasing removal of grit including means for conducting a small amount of settled water from the grit pot into the receiving chamber.

2. A cyclone degritter as defined in claim 1 in which further includes, means for conducting a small amount of settled water from the grit pot into the receiving chamber.

3. A cyclone degritter as defined in claim 2 in which the conducting means admits between 2% to 8% of feed flow.

4. A cyclone degritter as defined in claim 2 in which the conducting means admits between 2% to 4% of feed flow.

5. A cyclone degritter as defined in claim 1 further having a filter in the receiving chamber for removing fine dirt from the overflow.

6. A cyclone degritter as defined in claim 1 in which each cyclone member includes a downwardly extending baffle for directing solids downwardly into the grit pot.

7. A cyclone degritter for water comprising a top closure and a shell defining a cyclone unit for receiving and degritting water, the top closure having water inlet and outlet ports and primary and secondary sets of cyclones depending therefrom and extending into the interior of the shell with apexes for discharging grit into the shell, a vortex finder plate having a plurality of vortex finders therein axially aligned with corresponding cyclone members, a primary port of entry for directing water to the primary set of cyclones, the secondary set of cyclones, means for closing the second port of entry to restrict flow to the primary set of cyclones for one condition of water flow and for opeining the second port of entry to accommodate a high volume water flow, means for opening and closing the seal, a plurality of check valves at the apexes of the secondary cyclones to prevent short circuiting of water from the grit pot to the vortex finders when the second port of entry is closed and a bleed hole for bleeding a small amount of the feed from the underflow into the overflow to substantially increase removal of grit.

8. A cyclone degritter as defined in claim 7 which further includes additional sets of cyclones which sequentially aid in degritting as the feed flow rate increases.

9. A cyclone degritter for fitting into cartridge filter housings having a top housing member fitted to water supply and discharge means and a detachable lower housing member comprising a top closure and a shell defining a unit for receiving and degritting a feed flow of household water, the top closure having water inlet and outlet openings, a receiving chamber for discharging degritted water through the outlet, a vortex finder plate having a plurality of vortex finders located therein, a cyclone plate having a complementary plurality of downwardly depending cyclone members axially aligned with the vortex finders, means for directing water into each cyclone tangentially thereof to generate vortex flow of water within the cyclone for the purpose of degritting the water and issuing overflow through the vortex finder into the receiving chamber of the top closure, the shell serving as a grit pot, and means for substantially increasing removal of grit from said feed flow including means for conducting a small amount of settled water from the grit pot into the receiving chamber.

10. A cyclone degritter as defined in claim 9 in which the conducting means comprises a bleed hole through the vortex finder plate and the cyclone plate from the grit pot to the receiving chamber.

11. A cyclone degritter as defined in claim 9 in which the conducting means admits between 2% and 8% of feed flow.

* * * * *

UNITED STATES PATENT AND TRADEMARK OFFICE
CERTIFICATE OF CORRECTION

PATENT NO. : 4,726,902
DATED : 2/23/88
INVENTOR(S) : P. J. Hubbard et al

It is certified that error appears in the above-identified patent and that said Letters Patent are hereby corrected as shown below:

Cancel claim 2.

In claim 3, line 1, change "2" to --1--.

In claim 4, line 1, change "2" to --1--.

Signed and Sealed this

Twelfth Day of July, 1988

Attest:

DONALD J. QUIGG

*Attesting Officer*  *Commissioner of Patents and Trademarks*